H. W. SMITH.
Sled Brake.

No. 109,957.

Patented Dec. 6, 1870.

United States Patent Office.

HENRY W. SMITH, OF RAINSBURG, PENNSYLVANIA.

Letters Patent No. 109,957, dated December 6, 1870.

IMPROVEMENT IN SLEIGH-BRAKES.

The Schedule referred to in these Letters Patent and making part of the same.

*To all whom it may concern:*

Be it known that I, HENRY W. SMITH, of Rainsburg, in the county of Bedford and in the State of Pennsylvania, have invented certain new and useful Improvements in Sleigh-Brakes; and do hereby declare that the following is a full, clear, and exact description thereof, reference being had to the accompanying drawing and to the letters of reference marked thereon, making a part of this specification.

The nature of my invention consists in the construction of a brake for sleighs, as will be more fully hereinafter set forth.

In order to enable others skilled in the art to which my invention appertains to make and use the same, I will now proceed to describe its construction and operation, referring to the annexed drawing, in which—

Figure 1:
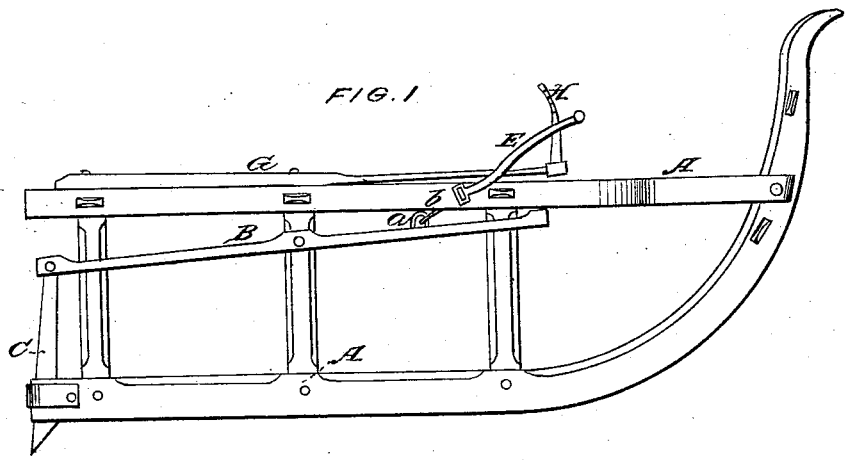

Figure 1 is a side elevation, and

Figure 2:
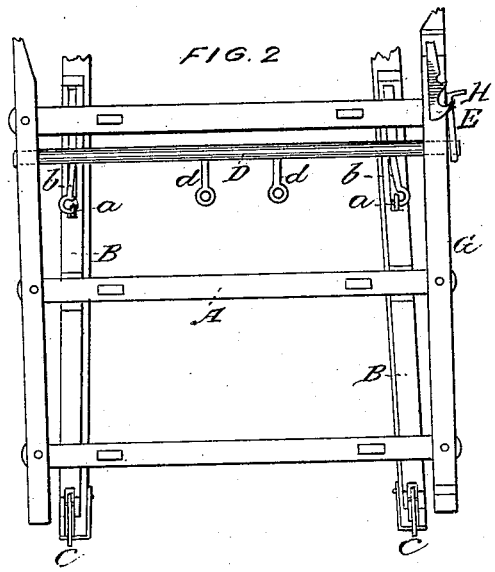

Figure 2, a plan view of a sleigh with my brake attached.

A represents a sleigh, of any suitable construction, to the middle knee of which, on each side, is pivoted a spring lever, B.

The rear ends of these levers B B are forked or slotted, and in the same is pivoted a brake or cutter, C, which passes downward through a mortise or slot in the heel of the runner.

The spring levers B B, which may be made of wood or metal, may be pivoted to any other suitable part of the sleigh, only so that when the brakes are not applied, the levers should run nearly, if not quite, parallel with the runners. On bob-sleds they may be pivoted on the bed-panel, if so desired.

The front ends of these spring levers are slotted longitudinally, as shown in fig. 2, and a hook, *a*, is passed through each of said slots.

The hook *a* is attached to the outer end of an arm, *b*, extending from the rock-shaft D, to the outer end of which is attached the hand-lever E. By means of this hand-lever the driver can raise and lower the brakes C C at will.

Near the rock-shaft D are arms *d d*, which are for the purpose of connecting an automatically self-acting lock, of any suitable description, of which no claim is made thereto under this patent.

A self-acting automatically-operating lock may be seen in the patent of myself and B. C. Smith, dated January 26, 1869.

My invention may be operated automatically, or by the driver, as desired.

On the fender or other suitable part of the sleigh A, is bolted a long spring, G, made of wood or metal.

On the front or loose end of this spring is attached a ratchet or notched rack, H, for holding the hand-lever E when the brakes are applied.

If the brakes should strike any obstruction, the spring G will yield and allow the brakes to pass over.

Having thus fully described my invention,

What I claim as new, and desire to secure by Letters Patent, is—

1. The spring G, provided with the ratchet H, and attached to the fender or other suitable place on the sleigh, substantially as and for the purposes herein set forth.

2. The spring levers B B, constructed as described, and pivoted at any suitable place to a sleigh, in combination with the brakes C C, hooks *a a*, and arms *b b*, substantially as and for the purposes herein set forth.

3. The combination of the cross rock-shaft D with its arms *d d*, and lever E, with the brakes C C, and levers B B, all substantially as set forth.

In testimony that I claim the foregoing, I have hereunto set my hand this 15th day of October, 1870.

HENRY W. SMITH.

Witnesses:
JOSIAH SHOEMAKER,
JOHN A. GUMP.